United States Patent [19]

Kosugi

[11] Patent Number: 4,955,659
[45] Date of Patent: Sep. 11, 1990

[54] VEHICULAR BACK DOOR FITTING MECHANISM

[75] Inventor: Toshio Kosugi, Hamakita, Japan

[73] Assignee: Suzuki Motor Company Ltd., Shizuoka, Japan

[21] Appl. No.: 330,126

[22] Filed: Mar. 29, 1989

[30] Foreign Application Priority Data

May 13, 1988 [JP] Japan .................. 63-116072

[51] Int. Cl.$^5$ .............................. B60J 1/18
[52] U.S. Cl. ................... 296/146; 296/202; 49/398; 49/502
[58] Field of Search ............. 296/146, 202; 49/398, 49/502

[56] References Cited

U.S. PATENT DOCUMENTS

| 4,629,244 | 12/1986 | Tiesler | 296/146 |
| 4,655,499 | 4/1987 | Piper | 296/146 |
| 4,719,665 | 1/1988 | Bell | 296/146 X |

FOREIGN PATENT DOCUMENTS 259523 12/1985 Japan .................. 296/146

Primary Examiner—Margaret A. Focarino
Assistant Examiner—Andrew C. Pike
Attorney, Agent, or Firm—McGlew & Tuttle

[57] ABSTRACT

A vehicular back door fitting mechanism includes a plurality of hinges arranged along one rear pillar with hinge portions turnable with respect to the one rear pillar. A window glass is provided with a cut out at one lower corner thereof so that the uppermost hinge is located at the cut-out part of the window glass. This arrangement of the uppermost hinge permits a hinge span which is longer, resulting in a fitting strength of the back door being increased remarkably. The uppermost hinge is covered with a trim element and at least one other hinge is located below the uppermost hinge, arranged inside of the back door so that they cannot be seen from the outside. This arrangement provides an improved appearance.

2 Claims, 3 Drawing Sheets

4,955,659

VEHICULAR BACK DOOR FITTING MECHANISM

FIELD OF THE INVENTION AND RELATED ART STATEMENT

The present invention relates to a vehicular back door fitting mechanism and more particularly to a vehicular back door fitting mechanism employable for a single door adapted to be opened by rotating it in the horizontal direction.

Some van type motorcars are provided with a single door as a back door 1 adapted to be opened by rotating it in the horizontal direction, as shown in FIG. 4.

As will be apparent from FIG. 5, with such back door 1, an arm 3 is secured to a rear pillar 2 so that the back door 1 is turnably supported on the rear pillar 2 using a hinge 6 of the type having one end of the arm 3 pivotally engaged with one end of a guard bar 4 for the back door 1 via a pin 5.

To ensure that a motorcar has the wide rear field of view, it is preferable that its rear window glass 7 has an increased sight area. In some cases, it is required from the design viewpoint that the rear window glass 7 has an increased sight area.

To this end, the foregoing type of motorcar is so constructed so that the rear window glass 7 has an increased sight area by locating the upper hinge 6 downward of the lower line 9 defining the lower end of a window frame 8 for the rear window glass 7.

Consequently, such a motorcar has a short hinge span. Particularly, in a case where a spare tire is attached to the back door 1, there is a fear that the free end of the back door 1 sinks gradually for a long period of time, because a large magnitude of load is continuously exerted on the hinge 6.

OBJECTS AND SUMMARY OF THE INVENTION

The present invention has been made with the foregoing background in mind and its object resides in providing a vehicular back door fitting mechanism which assures that a back door is supported firmly without a significant reduction in the field of view through a rear window glass associated therewith.

Another object of the present invention is to provide a vehicular back door fitting mechanism which has an improved appearance by arranging hinges inside of the back door so as to not allow them to be seen from the outside.

To accomplish the above objects, the present invention provides a vehicular back door fitting mechanism including a plurality of hinges with hinge elements rotatably arranged along one rear pillar, wherein a rear window glass is cut out at one lower corner thereof and a window frame is extended downward to the cut-out part of the rear window glass so that the uppermost hinge is provided in a space between the extended part of the window frame and the rear pillar.

Further, according to the present invention, a trim element is attached to the extended part of the window frame so that the uppermost hinge is covered with the trim element. Lower hinges exclusive of the uppermost one are arranged inside of the back door.

With such a vehicular back door fitting mechanism, it is assured that a longer hinge span can be provided and thereby the back door can be supported firmly. Although the rear window glass is cut out at one lower corner, the rear field of view remains almost unchanged because the reduction in sight area is small. It should be added that the respective hinges are hidden by the trim elements and the back door so that they can not be seen from the outside.

These and other objects, features and advantages of the present invention will be readily apparent from a reading of the following description which has been made with reference to the accompanying drawings.

BRIEF DESCRIPTION OF THE DRAWINGS

The present invention will be illustrated in the following drawings in which.

DETAILED DESCRIPTION OF THE PREFERRED EMBODIMENT

Now, the present invention will be described in a greater detail hereinafter with reference to the accompanying drawings which illustrate a preferred embodiment thereof.

Figure 1:
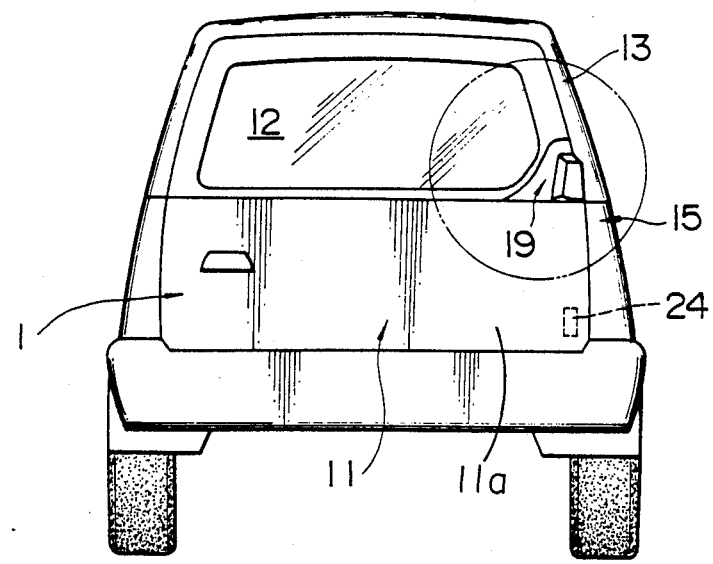
FIG. 1 is a rear view showing a motorcar for which a back door fitting mechanism of the present invention is employed.
Figure 2:
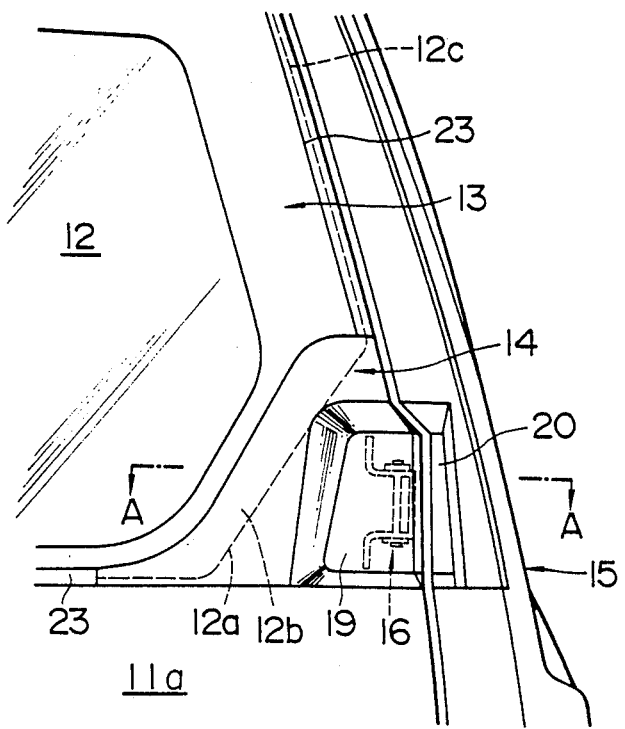
FIG. 2 is an enlarged view illustrating in detail the part as defined by a two-dot chain line in the form of a circle in FIG. 1.

A vehicular back door 11 shown in FIG. 1 includes a window frame 13 having a rear window glass 12 fitted thereto which substantially occupies an upper half of the back door 11. As is best seen in FIG. 2, the rear window glass 12 of the back door 11 has a cutout at the right-hand lower corner 12a. The window frame 13 is extended downward to an edge portion 12b located at the cut-out part of the rear window glass 12 so that an upper hinge 16 is provided in a space between an extended part 14 of a window frame 13 and the rear pillar 15 opposite to the extended part 14.

Figure 3:
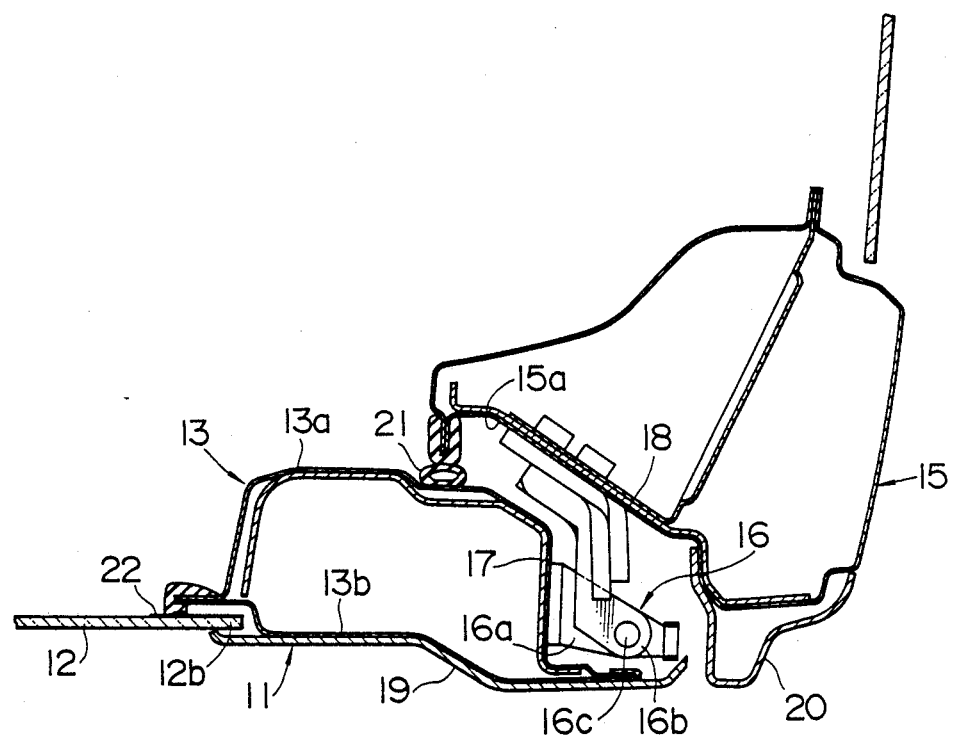
FIG. 3 is a sectional view taken in a line A—A in FIG. 2.
Figure 4:
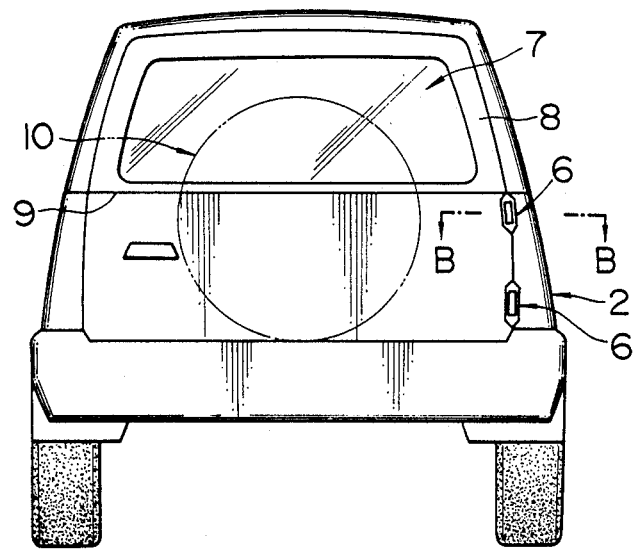
FIG. 4 is a rear view showing a motorcar for which a conventional back door fitting mechanism is employed.
Figure 5:
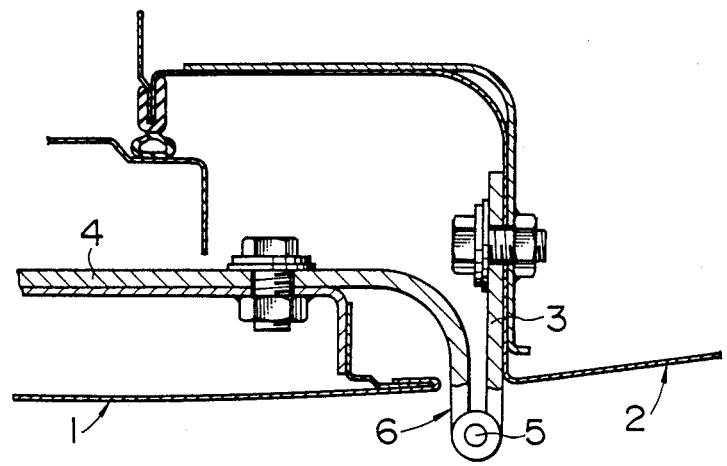
FIG. 5 is a sectional view taken in a line B—B in FIG. 4.

As shown in FIG. 3, the hinge 16 is so constructed that a male hinge part or first hinge part 16a is secured to a reinforcement plate 17 attached to an inner panel 13a of the window frame 13, a female hinge or second hinge part 16b is secured to a reinforcement plate 18 attached to an inner panel 15a of the rear pillar 15, and a pin 16c is extended through both the male hinge 16b and the female hinge 16b.

In addition, a trim element 19 is adhesively attached to an outer panel 13b of the window frame 13. The trim element 19 serves to hide the edge portion 12b of the window glass 12 and the hinge 16 so as not to allow them to be seen from the outside.

In FIG. 3, reference numeral 20 designates a trim element adhered to the rear pillar 15. The trim element 20 defines a boundary between the back door 11 and the rear pillar 15 while exhibiting the appearance of an integral structure comprising the back door 11 and the rear pillar 15. It should be noted that the trim element 20 is located at the same height as that of the trim element 19. Reference numeral 21 designates a weather strip adhesively secured to the pillar 15. The weather strip 21 is interposed between the rear pillar 15 and the window frame 13. Reference numeral 22 designates a black-colored ceramic print portion which extends along a periphery of the rear window glass 12 so that a part of the window glass 12 adhered to the window frame 13 is covered with the print portion 22 so as to not allow the foregoing part of the window glass 12 to be seen from the outside. Reference numeral 23 designates a molding portion adapted to cover an edge portion 12c of the window glass 12 exclusive of the edge portion 12b of the window glass 12.

As shown in FIG. 1, a lower hinge 24 is provided at a lower end part of the back door 11 so that it is located between a reinforcement plate of the back door 11 and a reinforcement plate of the rear pillar 15. It should be added that the lower hinge 24 is hidden by an outer panel 11a of the back door 11 so that it can not be seen from the outside.

As will be apparent from the above description, the present invention has provided a vehicular back door fitting mechanism which includes both upper and lower hinges located between the window frame and the rear pillar in the aforementioned manner. With this mechanism, a hinge span can be made longer, resulting in the back door being supported firmly. Another advantageous effect of the present invention is that the field of view remains substantially unchanged in comparison with the conventional mechanism, because the rear window glass is cut out only at one lower corner thereof. Another advantageous effect is that the mechanism has an improved appearance, because both the hinges are hidden by the trim elements and the rear door so as to not allow them to be seen from the outside.

I claim:

1. A vehicular back door arrangement, for fitting a back door to a vehicle rear pillar, comprising: a rear window glass positioned in a rear window glass opening of said back door, said rear window glass having a lower corner cut away slantwise, said rear window glass opening having a slanted lower corner corresponding to said window glass cutaway slantwise lower corner, said slanted lower corner of said back door window glass opening defining a hinge connection location, said hinge connection location being positioned adjacent said window glass cutaway corner; a top door hinge having a first hinge part connected to said hinge connection location of said back door and having a second hinge part connected to said vehicle rear pillar; and at least one lower hinge having a lower hinge first part connected to said back door at a lower hinge location, below said hinge connection location, and having a lower hinge second part connected to said vehicle rear pillar.

2. A vehicular back door arrangement according to claim 1, further comprising a trim element connected to said back door and covering said hinge connection location.

* * * * *